US009003402B1

(12) United States Patent
Carbone et al.

(10) Patent No.: US 9,003,402 B1

(45) Date of Patent: Apr. 7, 2015

(54) METHOD AND SYSTEM FOR INJECTING FUNCTION CALLS INTO A VIRTUAL MACHINE

(75) Inventors: Martim Carbone, Atlanta, GA (US); Matthew Conover, East Palo Alto, CA (US); Bruce Robert Montague, Santa Cruz, CA (US)

(73) Assignee: Symantec Corporation, Mountain View, CA (US)

( * ) Notice: Subject to any disclaimer, the term of this patent is extended or adjusted under 35 U.S.C. 154(b) by 972 days.

(21) Appl. No.: 12/969,334

(22) Filed: Dec. 15, 2010

(51) Int. Cl.
*G06F 9/455* (2006.01)

(52) U.S. Cl.
CPC .................................. *G06F 9/45554* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,917,740 | B1 * | 3/2011 | Klaiber et al. | 712/244 |
| 8,006,043 | B2 * | 8/2011 | Agesen | 711/152 |
| 8,341,316 | B2 * | 12/2012 | Kaplan et al. | 710/55 |
| 8,510,571 | B1 * | 8/2013 | Chang et al. | 713/191 |
| 8,510,756 | B1 * | 8/2013 | Koryakin et al. | 719/318 |
| 2009/0241109 | A1 * | 9/2009 | Vandegrift et al. | 718/1 |

* cited by examiner

*Primary Examiner* — Eric C Wai

(74) *Attorney, Agent, or Firm* — Wilmer Cutler Pickering Hale and Dorr LLP

(57) ABSTRACT

A method and apparatus for injecting function calls into a virtual machine whereby a Function Call Injection (FCI) process is employed, through which a Secure Virtual Machine (SVM) is used to trigger desired function call invocations inside a Guest Virtual Machine (GVM) by externally manipulating the GVMs memory and CPU register contents using a security API. Once the triggered function is executed, control is then returned at the originating SVM invocation point. Therefore, the GVM state is manipulated to externally inject function calls, making it possible to create control appliances which do not require an in-GVM agent.

20 Claims, 7 Drawing Sheets

METHOD AND SYSTEM FOR INJECTING FUNCTION CALLS INTO A VIRTUAL MACHINE

BACKGROUND OF THE INVENTION

Current computing systems, and computing system architectures, often employ a host computing system implementing one or more virtual machines, or "Guest Virtual Machines" (GVMs). In a typical implementation of this host and GVM architecture, the host computing system is the physical hardware system and each of the GVMs is a virtual entity created in memory associated with the host computing system. However, in many cases, each GVM behaves, for all practical purposes, as an independent virtual computing system that, in many cases, is capable of implementing/running its own copy of applications and, in some cases, its own operating system. Each GVM also typically has allocated its own memory and controls its own threads and associated memory stacks.

In some implementations of these host and GVM architectures, a special application called a hypervisor is employed through which each of the GVMs is implemented and controlled. Typically the hypervisor controls various GVM operations and the use and access of various hardware systems associated with the host computing system such as, but not limited to: keyboards, mice, various other input and output systems, data storage devices, and any other physical hardware systems associated with the host computing system.

In addition to the hypervisor, some host and GVM architectures include a special virtual machine, called a "Secure Virtual Machine" (SVM). While the SVM is itself a virtual machine run on the host system, unlike a typical GVM, the SVM is "aware" of the fact it is operating in a multiple GVM environment and is provided with special access and control privileges with respect to the other virtual machines, such as the ability to access the other virtual machines, i.e., the GVMs, and their associated memory. In many cases, the SVM is provided its privileged access to the other GVMs via a "hypercall interface" or security Application Program Interface (security API), that allows communication between the hypervisor and SVM and therefore often acts as an extension to the hypervisor.

One example of a currently available security API is VMsafe™ available from VMware™ Inc. of Palo Alto Calif. SVMs and security APIs typically provide a mechanism for changes to be made to, and interactions to be conducted with, individual GVMs without making changes to the hypervisor. This is generally desirable because changes to the hypervisor are often difficult and/or present a security risk. In addition, it is highly desirable to keep the hypervisor as simple/clean as possible.

One way in which SVMs and security APIs are currently used is to inspect/control the access of new/unknown memory pages by the individual GVMs. For instance, in some implementations, when a given GVM page handler determines that a desired page of memory is not present, the new page of memory is requested. The GVM state is then suspended and the new page of memory is then trapped and sent to the SVM for inspection/security analysis prior to resumption of the GVM and use by the GVM.

Traditionally, interactions with a virtual machine, i.e., a GVM, have required the presence of a software agent running in/on the GVM. An agent is typically a program, or other code, responsible for receiving commands, often via a network, and translating them into actions, such as operating system (OS) API function calls. Traditionally, the agent must be either pre-installed in the individual GVMs, or dynamically injected into the GVMs. However, agents are often undesirable, particularly in cases where security and transparency are important requirements, or when the memory footprint created by the presence of the agent is not acceptable.

Despite the problems described above, currently, there is no general, and/or OS-independent technique, for allowing external control of a virtual machine, i.e., a GVM, without the use of an in-GVM agent.

In addition, one disadvantage to the use of SVMs, and the current host/GVM architecture, is that, as noted above, each GVM can be implementing its own applications and Operating System (OS), or versions of a given application or OS, and while the SVM may have access to the GVMs memory, the SVM does not know what application or OS, or version of a given application or OS, is being implemented by the GVM. Therefore, the SVM often does not know the structural content, or context, of the data it can access. This results in what is termed a "semantic gap" whereby the SVM is unable to interpret the internal state of GVMs despite having full access to that state.

As noted above, there is currently no general, and OS-independent, technique for allowing external control of a virtual machine, i.e., a GVM, without the use of an in-GVM agent.

SUMMARY

In accordance with one embodiment, a method and system for injecting function calls into a virtual machine includes a Function Call Injection (FCI) process, through which a Secure Virtual Machine (SVM) is used to trigger desired function call invocations inside a Guest Virtual Machine (GVM) by externally manipulating the GVMs memory and CPU register contents using a security API. In one embodiment, once the triggered function call is executed, control is then returned at the originating SVM invocation point. Therefore, in one embodiment, the GVM state is manipulated to externally inject function calls, making it possible to create control appliances which do not require an in-GVM agent.

Using the method and system for injecting function calls into a virtual machine discussed herein, function call invocations are triggered inside a GVM without the use, or need for, in-GVM agents. In addition, since, using the method and system for injecting function calls into a virtual machine discussed herein, the GVM's stack is manipulated by SVM, the GVM's OS is used to create the desired function calls. Consequently, the method and system for injecting function calls into a virtual machine discussed herein is a general and OS-independent solution that largely avoids the semantic gap problem.

Figure 1:
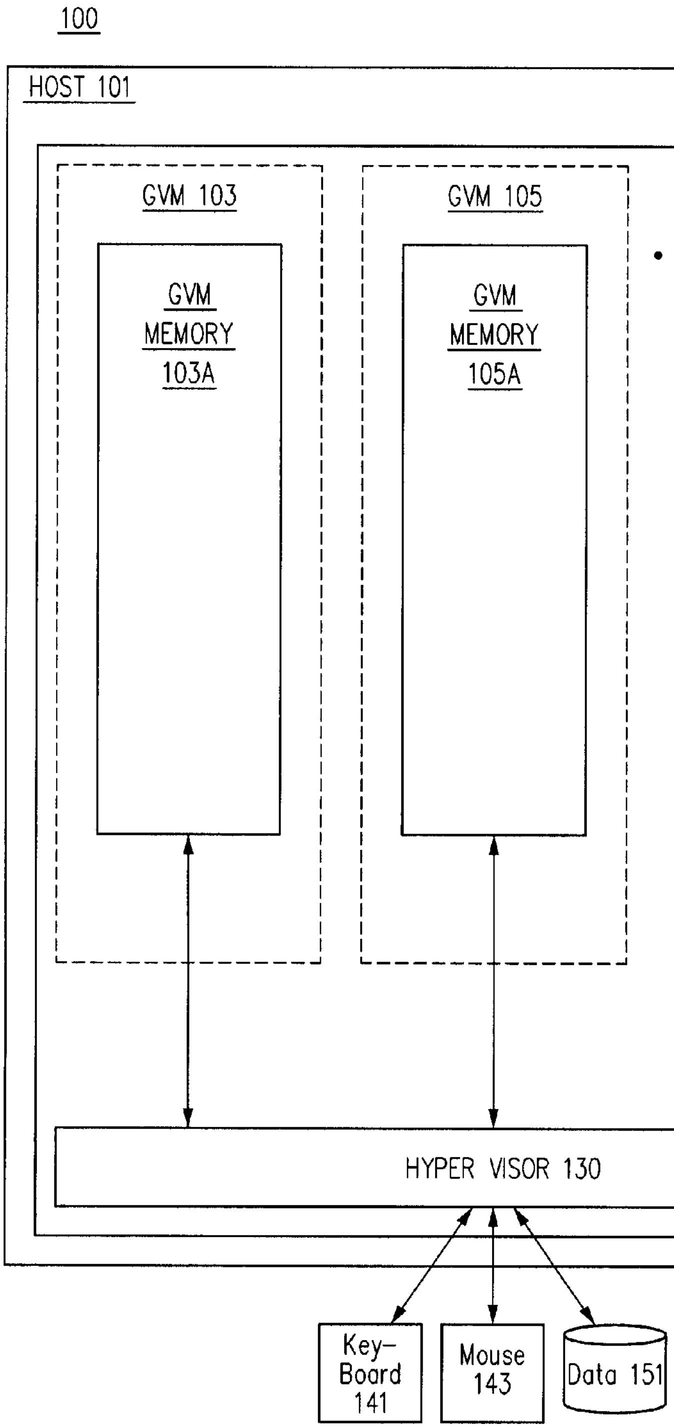
FIG. 1 is a block diagram of an exemplary hardware architecture for implementing one embodiment including a host computing system implementing multiple Guest Virtual Machines (GVMs); a Secure Virtual Machine (SVM); a hypervisor; and a security Application Program Interface (security API) in accordance with one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. The following description includes reference to specific embodiments for illustrative purposes. However, the illustrative discussion below is not intended to be exhaustive or to limit the invention to the precise forms disclosed. Many modifications and variations are possible in view of the teachings below. The embodiments discussed below were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms other than those shown and discussed herein and should not be construed as limited to the embodiments set forth herein, shown in the FIG.s, and/or described below.

According to one embodiment, a method and system for injecting function calls into a virtual machine includes a process for Function Call Injection (FCI) whereby a host virtual machine is provided that includes at least one Guest Virtual Machine (GVM) and at least one Secure Virtual Machine (SVM). In one embodiment, a hypervisor is provided. In one embodiment, a security Application Program Interface (security API) is provided that acts as an interface between the hypervisor and SVM and therefore operates as an extension to the hypervisor.

In one embodiment, a SVM invocation point is defined/found such that when the SVM invocation point is reached, the GVM is placed in a suspended state. In one embodiment, the SVM invocation point is reached and the GVM is placed in a suspended state. In one embodiment, the state of the GVM at the SVM invocation point is then saved.

In one embodiment, while the GVM is in the suspended state, the SVM is provided access to the GVM using the security API, also referred to herein as virtual machine introspection. In one embodiment, the SVM then modifies the contents of key CPU registers and the contents of the current thread stack associated with the GVM. In one embodiment, a FCI return address is added.

In one embodiment, the GVM is released from the suspended state and resumed. In one embodiment, when the GVM resumes, the GVM executes the function call just as if it had been invoked from GVM code. In one embodiment, when the FCI return address occurs, the GVM is placed in a suspended state and then restored to the saved GVM state of the SVM invocation point.

More specifically, in one embodiment, a hypervisor-enabled execution breakpoint is generated that requires no modifications inside the GVM. In one embodiment, the hypervisor-enabled execution breakpoint is placed/inserted at a pre-selected GVM code location, such that whenever that code is executed, a trap to the SVM occurs and the GVM is placed in a suspended state.

In one embodiment, once trapped, the SVM initially saves the context of the interrupted GVM thread at the hypervisor-enabled execution breakpoint. The SVM then sets the GVM's instruction pointer, i.e., in 32 bit architectures, the Extended Instruction Pointer (EIP) register (program counter in the x86 architecture) to the address of a desired function.

In one embodiment, the stack pointer, i.e., the Extended Stack Pointer (ESP) in a 32 bit architecture, is then subtracted so that room can be made in the stack for the arguments passed to the desired function and the return address. In a Windows™ environment, the location of the desired function can be determined by parsing the binary's in-memory symbol table once the base address is known. With other operating systems, different techniques may be used.

In one embodiment, e.g., in an Intel x-86 architecture, arguments to be passed to the desired function are copied to the stack in reverse order. In some embodiments, arguments to be passed to the desired function whose corresponding parameter is defined as call-by-values are directly copied to the stack. In some embodiments, in the case of call-by-reference arguments, a pointer pointing to the actual data is placed on the stack.

In some embodiments, the actual data can also be on the stack or in a dedicated memory page used for call-by-reference arguments (e.g., strings or file buffers). In one embodiment, before such a page is allocated, in one embodiment, by injecting a memory allocation function call, the stack technique is used to store call-by-reference arguments.

In one embodiment, a FCI return address is inserted and the FCI return address is initially set to a special location in the active code segment that has no actual code, e.g., a special location that is either known to be empty or is known to be typically used for padding purposes. In one embodiment, a hypervisor-enabled execution breakpoint is placed on this memory location and the return address of the desired function call is set to this hypervisor-enabled execution breakpoint. Consequently, when the desired function finishes executing, the final Return (RET) instruction will transfer control to this special location, suspending the GVM and trapping into the SVM. In one embodiment, empty or pad space is identified. In one embodiment, at a later stage, just as with the arguments, a dedicated page is allocated for the sole purpose of acting as a trapping destination for return instructions in the identified empty or pad space.

In one embodiment, after reassuming control, the SVM retrieves the desired function's scalar result, in one embodiment, by reading the value stored in the EAX register, and retrieves other additional output parameters of the desired function directly from the GVM's memory.

In one embodiment, the SVM releases the GVM and the GVM resumes and makes the desired function call. The GVM is then suspended when the FCI return address is reached and the SVM then restores the saved GVM state at the SVM invocation point. The GVM then resumes its execution from the point at which it was interrupted.

The process for Function Call Injection discussed herein can be applied in user or kernel-mode to invoke system-level API functions without the need for an in-guest agent to be present. In addition, since the process for Function Call Injection only manipulates the GVM's virtual hardware state, it is generic enough to be used with different operating systems, although, as those of skill in the art will recognize, the invoked routines may be somewhat different.

In addition, by invoking GVM routines, instead of trying to directly interpret its memory contents, the process for Function Call Injection discussed herein reduces the semantic gap problem as it relies on the GVM's own code that naturally navigates and interprets the state of the GVM.

FIG. 1 shows a block diagram of an exemplary hardware system 100 including host computing system 101, Guest Virtual Machines (GVMs) 103 and 105, Security Virtual Machine (SVM) 111, security API 120, and hypervisor 130, suitable for implementing one embodiment of a process for injecting function calls into a virtual machine, such as exemplary process 400 of FIG. 4, discussed below.

As used herein, the term "computing system", such as is included in the term "host computing system 101" includes, but is not limited to: a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In various embodiments, host computing system 101 is any computing system as defined herein and/or as known in the art at the time of filing and/or as developed thereafter, that includes components that can execute all, or part, of a process for injecting function calls into a virtual machine in accordance with at least one of the embodiments as described herein.

As seen in FIG. 1, in one embodiment, host computing system 101 includes keyboard 141, mouse 143, and external data 151.

As also seen in FIG. 1, in one embodiment, host computing system 101 includes host memory 102 and Guest Virtual Machines (GVMs) 103 and 105 implemented in, and/or associated with, host computing system 101 and host computing system memory 102. As discussed above, current computing systems, and computing system architectures, often employ a host computing system, such as host computing system 101 implementing one or more virtual machines, or "Guest Virtual Machines" (GVMs), such as are represented by GVMs 103 and 105. It should be noted that while two GVMs are shown in FIG. 1 for illustrative purposes, host computing system 101 can implement more of fewer GVMs and GVMs 103 and 105 are therefore representative of any number of GVMs.

As also shown in FIG. 1, in one embodiment, GVMs 103 and 105 include GVM memories 103A and 105A, respectively.

In a typical implementation of host and GVM architecture, the host computing system is the physical hardware system and each of the GVMs is a virtual entity created in memory associated with the host computing system. However, in many cases, each GVM behaves, for all practical purposes, as an independent virtual computing system that, in many cases, is capable of implementing/running its own copy of applications and, in some cases, its own operating system. Each GVM also typically has allocated its own memory, such as GVM memories 103A and/or 105A of FIG. 1, and controls its own threads and associated memory stacks, such as GVM stack 211 of FIG. 2, discussed below.

The creation, implementation, operation, and use of GVMs, and host computing system/GVM architectures, are well known to those of skill in the art. Consequently, a more detailed discussion of specific examples of the creation, implementation, operation, and use of GVMs, and host computing system/GVM architectures, is omitted here to avoid detracting from the invention.

As also shown in FIG. 1, host memory 102 includes Security Virtual Machine (SVM) 111 with SVM memory 111A.

In one embodiment, SVM 111 is itself a virtual machine run on host computing system 101. However, unlike a typical GVM, such as GVMs 103 and 105, SVM 111 is "aware" of the fact it is operating in a multiple GVM environment and is provided with special access and control privileges with respect to the other virtual machines, such as the ability to access the other virtual machines, i.e., GVMs 103 and 105, and their associated memory, such as GVM memories 103A and 105A.

The creation, implementation, operation, and use of SVMs, and host computing system/GVM architectures, are well known to those of skill in the art. Consequently, a more detailed discussion of specific examples of the creation, implementation, operation, and use of SVMs, and host computing system/GVM architectures, is omitted here to avoid detracting from the invention.

Also shown in FIG. 1 is hypervisor 130 implemented on, and/or associated with, host computing system 101 and host memory 102. In one embodiment, each of GVMs 103 and/or 105 is accessed, controlled, and/or manipulated via hypervisor 130. In one embodiment, hypervisor 130 controls various GVM 103 and 105 operations and the use and access of various hardware systems associated with host computing system 101 such as, but not limited to: keyboards, such as keyboard 141, mice, such as mouse 143, various other input and output systems, data storage devices, such as Data 151, and any other physical hardware systems associated with the host computing system.

The creation, implementation, operation, and use of hypervisors, and host computing system/GVM architectures, are well known to those of skill in the art. Consequently, a more detailed discussion of specific examples of the creation, implementation, operation, and use of hypervisors, and host computing system/GVM architectures, is omitted here to avoid detracting from the invention.

Also shown in FIG. 1 is security API 120 as implemented in, and/or associated with, host computing system 101 and/or SVM 111. In one embodiment, SVM 111 is provided privileged access to the other GVMs 103 and/or 105 via the "hypercall interface" provided by security API 120, that allows communication between hypervisor 130 and SVM 130 and therefore allows SVM 111 to act as an extension to hypervisor 130. One example of a currently available security API, is VMsafe™ available from VMware™ Inc. of Palo Alto Calif.

As also noted above, SVMs and security APIs typically provide a mechanism for changes to be made to, and interactions to be conducted with, individual GVMs without making changes to the hypervisor. This is generally desirable because changes to the hypervisor are often difficult and/or present a security risk. In addition, it is typically highly desirable to keep the hypervisor as simple/clean as possible.

The creation, implementation, operation, and use of security APIs is known to those of skill in the art. However, absent various embodiments discussed herein, security APIs have not been used to trigger desired function call invocations inside a Guest Virtual Machine (GVM) by externally manipulating the GVMs memory and CPU register contents thereby making it possible to create control appliances which do not require an in-GVM agent.

On the contrary, one way in which SVMs and security APIs are currently used is to inspect/control the access of new/unknown memory pages by the individual GVMs. For instance, in some implementations, when a given GVM page handler determines that a desired page of memory is not present, the new page of memory is requested. The new page of memory is then trapped and sent to the SVM for inspection/security analysis prior to use by the GVM.

As also noted above, absent various embodiments discussed herein, interactions with a virtual machine, i.e., a GVM such as GVMs 103 and/105 of FIG. 1, have required the presence of a software agent running in/on the GVM. An agent is typically a program, or other code, responsible for receiving commands, often via a network, and translating them into actions, such as operating system (OS) API function calls. Traditionally, the agent must be either pre-installed in the individual GVMs, or dynamically injected into the GVMs. However, agents are often undesirable, particularly in cases where security and transparency are important requirements, or when the memory footprint created by the presence of the agent is not acceptable.

Despite the problems described above, absent various embodiments discussed herein, there was no general, and/or OS-independent technique, for allowing external control of a virtual machine, i.e., a GVM, without the use of an in-GVM agent.

In addition, one historical disadvantage to the use of SVMs, and the host/GVM architecture, absent various embodiments discussed herein, is that, as noted above, each GVM can be implementing its own Operating System (OS), or version of a given OS, and while the SVM may have access to the GVMs memory, the SVM does not know what OS, or version of a given OS, is being implemented by the GVM and therefore the SVM often does not know the structural content, or context, of the data it can access. This results in what is termed a "semantic gap" whereby the SVM is unable to interpret the internal state of GVMs despite having full access to that state.

As discussed above, due largely to the semantic gap problem, absent various embodiments discussed herein, there was no general, and OS-independent, technique for allowing external control of a virtual machine, i.e., a GVM such as GVMs 103 and/or 105 of FIG. 1, without the use of an in-GVM agent.

Figure 2:
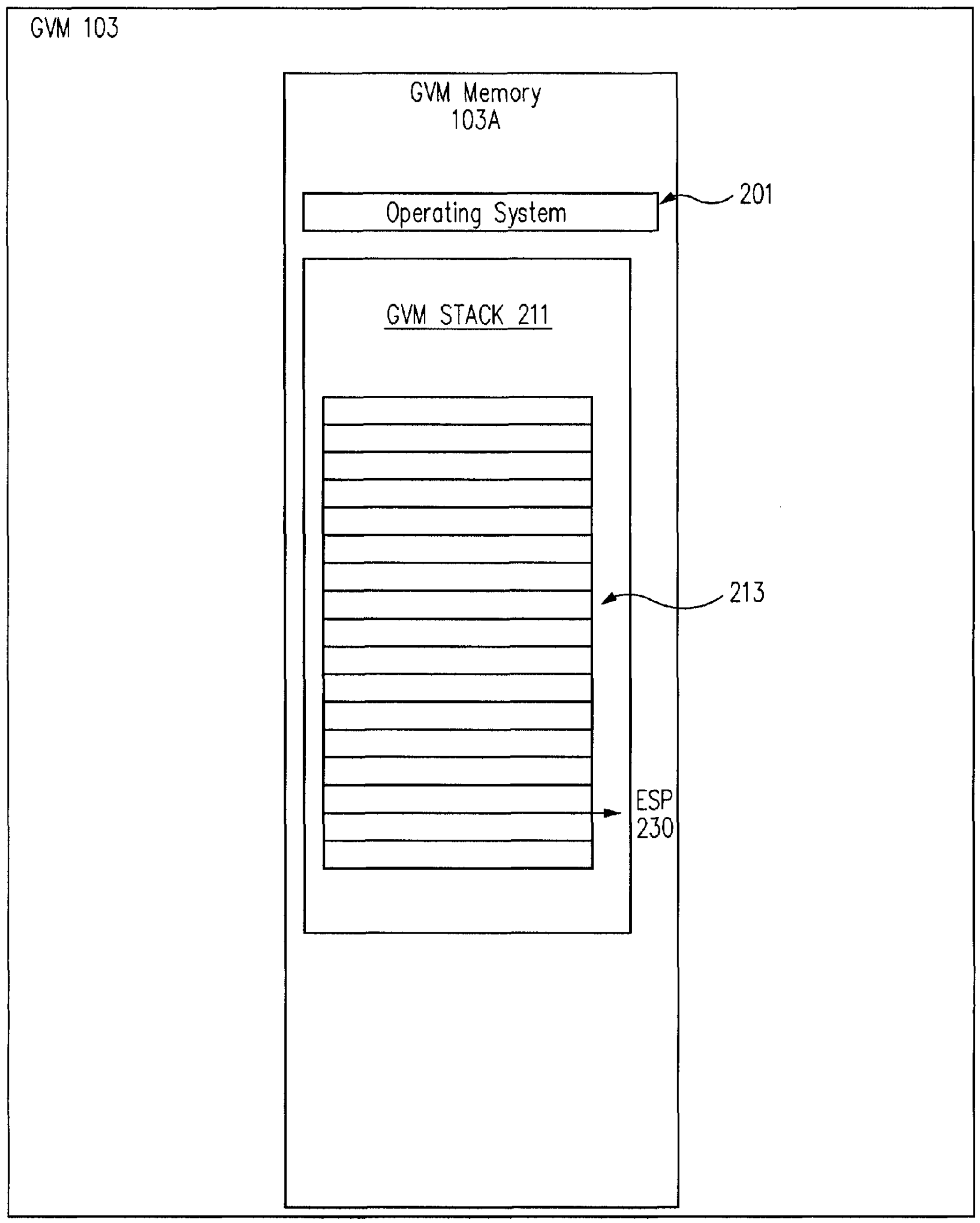
FIG. 2 is a block diagram of an exemplary GVM implemented in the host computing system of FIG. 1, in accordance with one embodiment.

FIG. 2 is a block diagram illustrating one embodiment of a GVM, i.e., GVM 103, including GVM memory 103A, in more detail.

As seen in FIG. 2, GVM memory 103A includes operating system 201 and GVM stack 211.

In one embodiment, operating system 201 includes procedures, data, and/or instructions for handling various services and performing/coordinating hardware dependent tasks.

In one embodiment, GVM stack 211 is a memory stack associated with a given thread being processed by a CPU associated with GVM 103. As seen in FIG. 2, GVM stack 211 also includes registers 213 and Extended Stack Pointer (ESP) 230.

As noted above, the creation, implementation, operation, and use of GVMs, GVM memory, and GVM stacks, and host computing system/GVM architectures, is well known to those of skill in the art. Consequently, a more detailed discussion of specific examples of the creation, implementation, operation, and use of GVMs, such as GVM 103 of FIG. 2, GVM memory, such as GVM memory 103A of FIG. 2; and GVM stacks, such as GVM stack 211 and ESP 230 of FIG. 2, and host computing system/GVM architectures, is omitted here to avoid detracting from the invention.

Those of skill in the art will readily recognize that the choice of components, data, modules, and information shown in FIG. 2, the organization of the components, data, modules, and information shown in FIG. 2, and the manner of storage and location of storage of the data, modules, and information shown in FIG. 2 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 2 are illustrative only and not limiting. In various other embodiments, the particular modules and/or data shown in FIG. 2 can be grouped together in fewer modules and/or data locations or divided among more modules and/or data locations. Consequently, those of skill in the art will recognize that other orders and/or grouping are possible and the particular modules and/or data, order, and/or grouping shown in FIG. 2 discussed herein do not limit the scope as claimed below.

A more detailed discussion of the operation of GVM 103 and GVM memory 103A is provided below with respect to FIG. 4.

Figure 3:
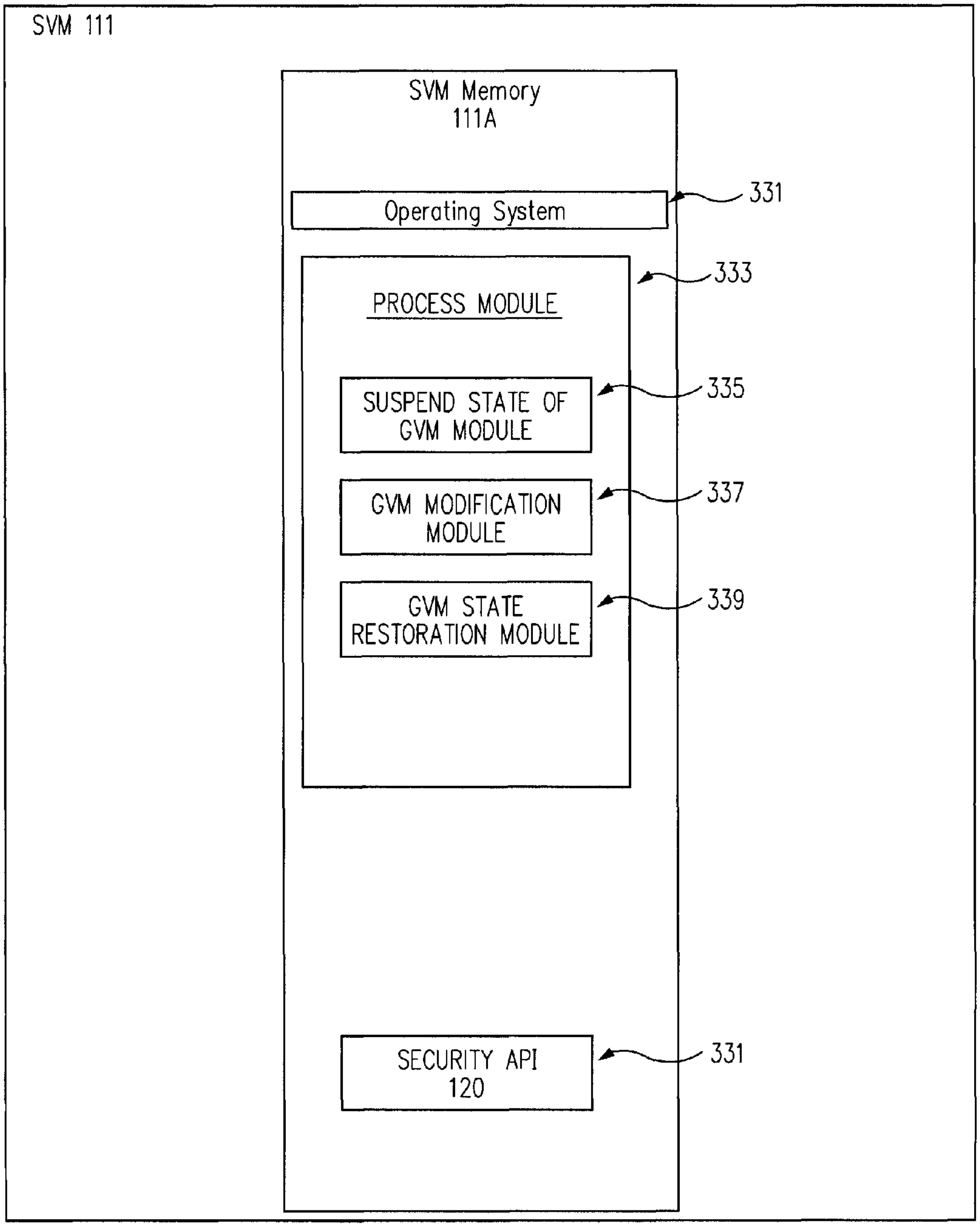
FIG. 3 is a block diagram of an exemplary SVM implemented in the host computing system of FIG. 1, in accordance with one embodiment.

FIG. 3 is a block diagram illustrating one embodiment of an SVM, i.e., SVM 111, including SVM memory 111A, in more detail.

As seen in FIG. 3, SVM memory 111A includes operating system 331 that includes procedures, data, and/or instructions for handling various services and performing/coordinating hardware dependent tasks.

As also seen in FIG. 3, SVM memory 111A includes process module 333 that includes procedures, data, and/or instructions, for implementing at least part of a process for injecting function calls into a virtual machine, such as exemplary process 400 of FIG. 4, discussed below.

As also seen in FIG. 3, process module 333 includes suspend state of GVM module 335 that includes procedures, data, and/or instructions, for suspending the state of a GVM, such as GVMs 103 and/or 105 of FIG. 1.

As also seen in FIG. 3, process module 333 includes GVM modification module 337 that includes procedures, data, and/or instructions, for modifying the CPU registers and/or the contents of a GVM stack, such as GVM stack 211 of FIG. 2, of GVMs, such as GVM 103 and/or GVM 105 of FIG. 1.

As also seen in FIG. 3, process module 333 includes GVM state restoration module 339 that includes procedures, data, and/or instructions, for restoring the state of a GVM, such as such as GVM 103 and/or GVM 105 of FIG. 1

As also seen in FIG. 3, SVM memory 111A includes at least part of security API 120.

Those of skill in the art will readily recognize that the choice of components, data, modules, and information shown in FIG. 3, the organization of the components, data, modules, and information shown in FIG. 3, and the manner of storage and location of storage of the data, modules, and information shown in FIG. 3 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 3 are illustrative only and not limiting. In various other embodiments, the particular modules and/or data shown in FIG. 3 can be grouped together in fewer modules and/or data locations or divided among more modules and/or data locations. Consequently, those of skill in the art will recognize that other orders and/or grouping are possible and the particular modules and/or data, order, and/or grouping shown in FIG. 3 discussed herein do not limit the scope as claimed below.

A more detailed discussion of the operation of SVM 111 is provided below with respect to FIG. 4.

In accordance with one embodiment, a method and system for injecting function calls into a virtual machine includes a Function Call Injection (FCI) process, through which a Secure Virtual Machine (SVM) is used to trigger desired function call invocations inside a Guest Virtual Machine (GVM) by externally manipulating the GVMs memory and CPU register contents using a security API. In one embodiment, once the triggered function is executed, control is then returned at the originating SVM invocation point. Therefore, in one embodiment, the GVM state is manipulated to externally inject function calls, making it possible to create control appliances which do not require an in-GVM agent.

Figure 4:
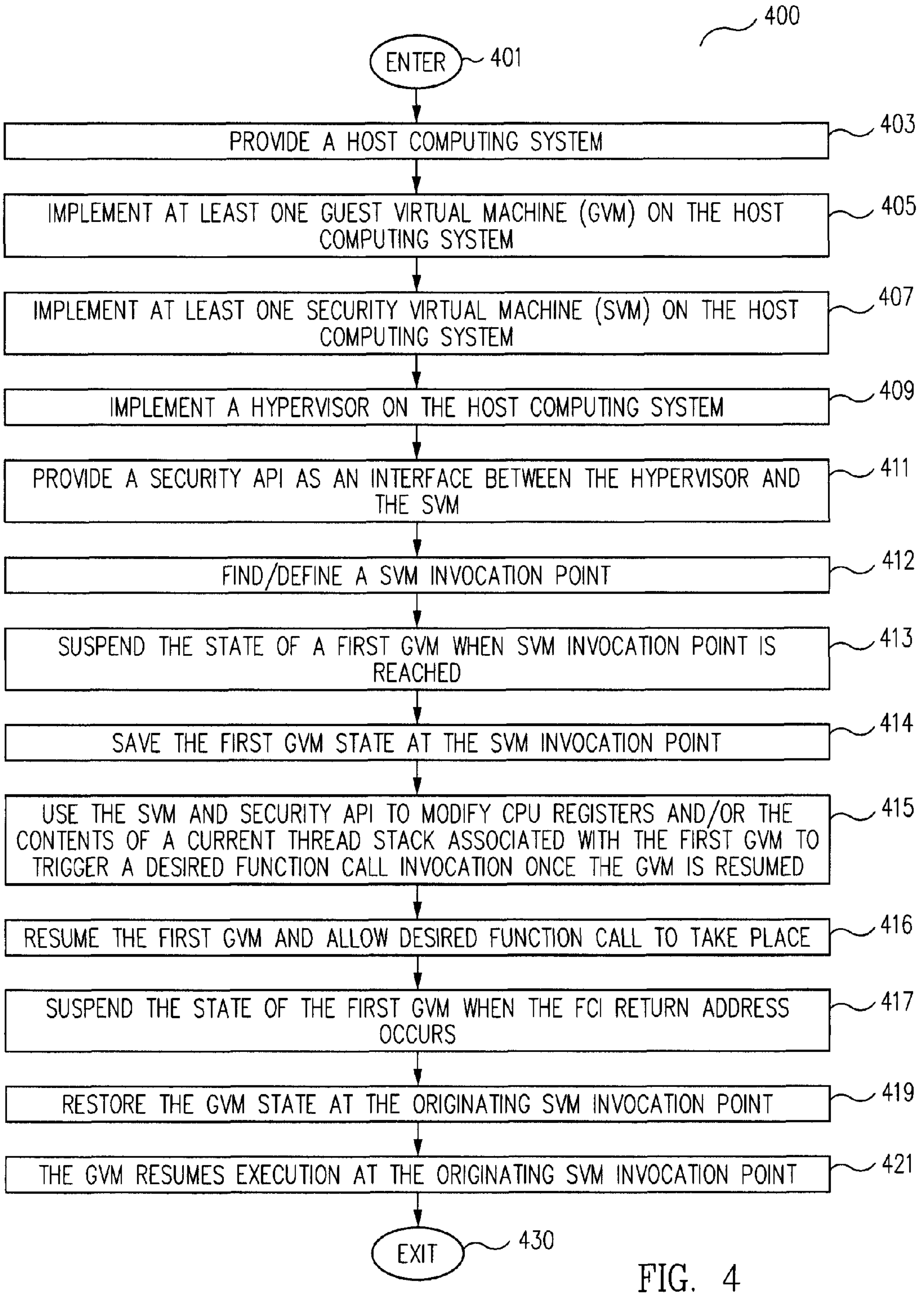
FIG. 4 is a flow chart depicting a process for injecting function calls into a virtual machine in accordance with one embodiment.

FIG. 4 is a flow chart depicting a process for injecting function calls into a virtual machine 400 in accordance with one embodiment.

Process for injecting function calls into a virtual machine 400 begins at ENTER OPERATION 401 and process flow proceeds to PROVIDE A HOST COMPUTING SYSTEM OPERATION 403.

In one embodiment, at PROVIDE A HOST COMPUTING SYSTEM OPERATION 403 a host computing system is provided.

In one embodiment, at PROVIDE A HOST COMPUTING SYSTEM OPERATION 403 a host computing system, such as host computing system 101 of FIG. 1 is provided.

As used herein, the term "computing system", such as is included in the term "host computing system" includes, but is not limited to: a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

Returning to FIG. 4, in various embodiments, the host computing system provided at PROVIDE A HOST COMPUTING SYSTEM OPERATION 403 is any computing system as defined herein and/or as known in the art at the time of filing and/or as developed thereafter, that includes components that can execute all, or part, of a process for injecting function calls into a virtual machine in accordance with at least one of the embodiments as described herein.

In one embodiment, once a host computing system is provided at PROVIDE A HOST COMPUTING SYSTEM OPERATION 403, process flow proceeds to IMPLEMENT AT LEAST ONE GUEST VIRTUAL MACHINE (GVM) ON THE HOST COMPUTING SYSTEM OPERATION 405.

In one embodiment, at IMPLEMENT AT LEAST ONE GUEST VIRTUAL MACHINE (GVM) ON THE HOST COMPUTING SYSTEM OPERATION 405 at least one Guest Virtual Machine (GVM) is implemented in, and/or associated with, the host computing system of PROVIDE A HOST COMPUTING SYSTEM OPERATION 403.

In one embodiment, at IMPLEMENT AT LEAST ONE GUEST VIRTUAL MACHINE (GVM) ON THE HOST COMPUTING SYSTEM OPERATION 405 at least one Guest Virtual Machine (GVM), such as GVM 103 and/or GVM 105 of FIG. 1 and FIG. 2, is implemented in, and/or associated with, a host computing system of PROVIDE A HOST COMPUTING SYSTEM OPERATION 403, such as host computing system 101 of FIG. 1.

Returning to FIG. 4, as discussed above, current computing systems, and computing system architectures, often employ a host computing system, such as is provided at PROVIDE A HOST COMPUTING SYSTEM OPERATION 403, implementing one or more virtual machines, or "Guest Virtual Machines" (GVMs). In a typical implementation of this host and GVM architecture, the host computing system is the physical hardware system and each of the GVMs is a virtual entity created in memory associated with the host computing system. However, in many cases, each GVM behaves, for all practical purposes, as an independent virtual computing system that, in many cases, is capable of implementing/running its own copy of applications and, in some cases, its own operating system. Each GVM also typically has allocated its own memory, such as GVM memories 103A and/or 105A of FIG. 1, and controls its own threads and associated memory stacks, such as GVM stack 211 of FIG. 2.

The creation, implementation, operation, and use of GVMs, and host computing system/GVM architectures, are well known to those of skill in the art. Consequently, a more detailed discussion of specific examples of the creation, implementation, operation, and use of GVMs, and host computing system/GVM architectures, is omitted here to avoid detracting from the invention.

Returning to FIG. 4, in one embodiment, once at least one Guest Virtual Machine (GVM) is implemented in, and/or associated with, the host computing system of PROVIDE A HOST COMPUTING SYSTEM OPERATION 403 at IMPLEMENT AT LEAST ONE GUEST VIRTUAL MACHINE (GVM) ON THE HOST COMPUTING SYSTEM OPERATION 405, process flow proceeds to IMPLEMENT AT LEAST ONE SECURITY VIRTUAL MACHINE (SVM) ON THE HOST COMPUTING SYSTEM OPERATION 407.

In one embodiment, at IMPLEMENT AT LEAST ONE SECURITY VIRTUAL MACHINE (SVM) ON THE HOST COMPUTING SYSTEM OPERATION 407, at least one Security Virtual Machine (SVM) is implemented in, and/or associated with, the host computing system of PROVIDE A HOST COMPUTING SYSTEM OPERATION 403.

In one embodiment, at IMPLEMENT AT LEAST ONE SECURITY VIRTUAL MACHINE (SVM) ON THE HOST COMPUTING SYSTEM OPERATION 407 at least one Secure Virtual Machine (SVM), such as SVM 111 of FIG. 1 and FIG. 3, is implemented in, and/or associated with, a host computing system of PROVIDE A HOST COMPUTING SYSTEM OPERATION 403, such as host computing system 101 of FIG. 1.

As noted above, a Secure Virtual Machine (SVM) is itself a virtual machine run on the host system. However, unlike a typical GVM, such as GVMs 103 and 105 of FIG. 1, the SVM is "aware" of the fact it is operating in a multiple GVM environment and is provided with special access and control privileges with respect to the other virtual machines, such as the ability to access the other virtual machines, i.e., GVMs 103 and 105, and their associated memory, such as GVM memories 103A and 105A of FIG. 1.

Returning to FIG. 4, the creation, implementation, operation, and use of SVMs, and host computing system/GVM architectures, is well known to those of skill in the art. Consequently, a more detailed discussion of specific examples of the creation, implementation, operation, and use of SVMs, and host computing system/GVM architectures, is omitted here to avoid detracting from the invention.

In one embodiment, once, at least one Security Virtual Machine (SVM) is implemented in, and/or associated with, the host computing system of PROVIDE A HOST COMPUTING SYSTEM OPERATION 403 at IMPLEMENT AT LEAST ONE SECURITY VIRTUAL MACHINE (SVM) ON THE HOST COMPUTING SYSTEM OPERATION 407, process flow proceeds to IMPLEMENT A HYPERVISOR ON THE HOST COMPUTING SYSTEM OPERATION 409.

In one embodiment, at IMPLEMENT A HYPERVISOR ON THE HOST COMPUTING SYSTEM OPERATION 409 a hypervisor is implemented on, and/or associated with, the host computing system of PROVIDE A HOST COMPUTING SYSTEM OPERATION 403, the GVMs of IMPLEMENT AT LEAST ONE GUEST VIRTUAL MACHINE (GVM) ON THE HOST COMPUTING SYSTEM OPERATION 405, and/or the SVM of IMPLEMENT AT LEAST ONE SECURITY VIRTUAL MACHINE (SVM) ON THE HOST COMPUTING SYSTEM OPERATION 407.

In one embodiment, at IMPLEMENT A HYPERVISOR ON THE HOST COMPUTING SYSTEM OPERATION 409, a hypervisor, such as hypervisor 130 of FIG. 1, is implemented on, and/or associated with, the host computing system of PROVIDE A HOST COMPUTING SYSTEM OPERATION 403 (FIG. 4), such as host computing system 101 of FIG. 1, the GVMs of IMPLEMENT AT LEAST ONE GUEST VIRTUAL MACHINE (GVM) ON THE HOST COMPUTING SYSTEM OPERATION 405 (FIG. 4), such as GVMs 103 and/or 105 of FIG. 1, and/or the SVM of IMPLEMENT AT LEAST ONE SECURITY VIRTUAL MACHINE (SVM) ON THE HOST COMPUTING SYSTEM OPERATION 407 (FIG. 4), such as SVM 111 of FIG. 1.

As noted above, in some implementations of host and GVM architectures, a hypervisor is employed through which each of the GVMs is implemented and controlled. Typically the hypervisor controls various GVM operations and the use and access of various hardware systems associated with the host computing system such as, but not limited to: keyboards, such as keyboard 141 of FIG. 1, mice, such as mouse 143 of FIG. 1, various other input and output systems, data storage devices, such as Data 151 of FIG. 1, and any other physical hardware systems associated with the host computing system.

Returning to FIG. 4, the creation, implementation, operation, and use of hypervisors, and host computing system/GVM architectures, is well known to those of skill in the art. Consequently, a more detailed discussion of specific examples of the creation, implementation, operation, and use of hypervisors, and host computing system/GVM architectures, is omitted here to avoid detracting from the invention.

In one embodiment, once a hypervisor is implemented on, and/or associated with, the host computing system of PROVIDE A HOST COMPUTING SYSTEM OPERATION 403, the GVMs of IMPLEMENT AT LEAST ONE GUEST VIRTUAL MACHINE (GVM) ON THE HOST COMPUTING SYSTEM OPERATION 405, and/or the SVM of IMPLEMENT AT LEAST ONE SECURITY VIRTUAL MACHINE (SVM) ON THE HOST COMPUTING SYSTEM OPERATION 407 at IMPLEMENT A HYPERVISOR ON THE HOST COMPUTING SYSTEM OPERATION 409, process flow proceeds to PROVIDE A SECURITY API AS AN INTERFACE BETWEEN THE HYPERVISOR AND THE SVM OPERATION 411.

In one embodiment, at PROVIDE A SECURITY API AS AN INTERFACE BETWEEN THE HYPERVISOR AND THE SVM OPERATION 411 a security API is implemented in, and/or associated with, the host computing system of PROVIDE A HOST COMPUTING SYSTEM OPERATION 403, the GVMs of IMPLEMENT AT LEAST ONE GUEST VIRTUAL MACHINE (GVM) ON THE HOST COMPUTING SYSTEM OPERATION 405, the hypervisor of IMPLEMENT A HYPERVISOR ON THE HOST COMPUTING SYSTEM OPERATION 409, and/or the SVM of IMPLEMENT AT LEAST ONE SECURITY VIRTUAL MACHINE (SVM) ON THE HOST COMPUTING SYSTEM OPERATION 407.

As noted above, in addition to the GVMs of IMPLEMENT AT LEAST ONE GUEST VIRTUAL MACHINE (GVM) ON THE HOST COMPUTING SYSTEM OPERATION 405, the hypervisor of IMPLEMENT A HYPERVISOR ON THE HOST COMPUTING SYSTEM OPERATION 409, and the SVM of IMPLEMENT AT LEAST ONE SECURITY VIRTUAL MACHINE (SVM) ON THE HOST COMPUTING SYSTEM OPERATION 407, the SVM is provided privileged access to the other GVMs via a "hypercall interface" or security Application Program Interface (security API), that allows communication between the hypervisor and SVM and therefore often acts as an extension to the hypervisor.

One example of a currently available security API, such as is provided at PROVIDE A SECURITY API AS AN INTERFACE BETWEEN THE HYPERVISOR AND THE SVM OPERATION 411 is VMsafe™ available from VMware™ Inc. of Palo Alto Calif.

As also noted above, SVMs and security APIs typically provide a mechanism for changes to be made to, and interactions to be conducted with, individual GVMs without making changes to the hypervisor. This is generally desirable because changes to the hypervisor are often difficult and/or present a security risk. In addition, it is typically highly desirable to keep the hypervisor as simple/clean as possible.

The creation, implementation, operation, and use of security APIs is known to those of skill in the art. However, absent various embodiments discussed herein, security APIs have not been used to trigger desired function call invocations inside a Guest Virtual Machine (GVM) by externally manipulating the GVMs memory and CPU register contents thereby making it possible to create control appliances which do not require an in-GVM agent.

On the contrary, one way in which SVMs and security APIs are currently used is to inspect/control the access of new/ unknown memory pages by the individual GVMs. For instance, in some implementations, when a given GVM page handler determines that a desired page of memory is not present, the new page of memory is requested. The new page of memory is then trapped and sent to the SVM for inspection/security analysis prior to use by the GVM.

As also noted above, absent various embodiments discussed herein, interactions with a virtual machine, i.e., a GVM such as GVMs 103 and/105 of FIG. 1, have required the presence of a software agent running in/on the GVM. An agent is typically a program, or other code, responsible for receiving commands, often via a network, and translating them into actions, such as operating system (OS) API function calls. Traditionally, the agent must be either pre-installed in the individual GVMs, or dynamically injected into the GVMs. However, agents are often undesirable, particularly in cases where security and transparency are important requirements, or when the memory footprint created by the presence of the agent is not acceptable.

Despite the problems described above, absent various embodiments discussed herein, there was no general, and/or OS-independent technique, for allowing external control of a virtual machine, i.e., a GVM, without the use of an in-GVM agent.

In addition, one historical disadvantage to the use of SVMs, and the host/GVM architecture, absent various embodiments discussed herein, is that, as noted above, each GVM can be implementing its own Operating System (OS), or version of a given OS, and while the SVM may have access to the GVMs memory, the SVM does not know what OS, or version of a given OS, is being implemented by the GVM and therefore the SVM often does not know the structural content, or context, of the data it can access. This results in what is termed a "semantic gap" whereby the SVM is unable to interpret the internal state of GVMs despite having full access to that state.

As discussed above, due in large part to the semantic gap problem, absent various embodiments discussed herein, there was no general, and OS-independent, technique for allowing external control of a virtual machine, i.e., a GVM such as GVMs 103 and/or 105 of FIG. 1, without the use of an in-GVM agent.

Returning to FIG. 4, once a security API is implemented in, and/or associated with, the host computing system of PROVIDE A HOST COMPUTING SYSTEM OPERATION 403, the GVMs of IMPLEMENT AT LEAST ONE GUEST VIRTUAL MACHINE (GVM) ON THE HOST COMPUTING SYSTEM OPERATION 405, the hypervisor of IMPLEMENT A HYPERVISOR ON THE HOST COMPUTING SYSTEM OPERATION 409, and/or the SVM of IMPLEMENT AT LEAST ONE SECURITY VIRTUAL MACHINE (SVM) ON THE HOST COMPUTING SYSTEM OPERATION 407 at PROVIDE A SECURITY API AS AN INTERFACE BETWEEN THE HYPERVISOR AND THE SVM OPERATION 411 process flow proceeds to FIND/DEFINE A SVM INVOCATION POINT OPERATION 412.

In one embodiment, at FIND/DEFINE A SVM INVOCATION POINT OPERATION 412 a SVM invocation point is defined/found such that when the SVM invocation point is reached the GVM is placed in a suspended state.

In one embodiment, at FIND/DEFINE A SVM INVOCATION POINT OPERATION 412 a hypervisor-enabled execution breakpoint is generated that requires no modifications inside the GVM.

In one embodiment, at FIND/DEFINE A SVM INVOCATION POINT OPERATION 412 the hypervisor-enabled execution breakpoint is placed/inserted at a pre-selected GVM code location, such that whenever that code is executed, a trap to the SVM occurs and the GVM is placed in a suspended state.

Numerous means, methods, procedures, processes, and mechanisms for finding/defining a SVM invocation point such that when the SVM invocation point is reached the GVM is placed in a suspended state are known in the art. Consequently, a more detailed discussion of means, methods, procedures, processes, and mechanisms for finding/defining a SVM invocation point such that when the SVM invocation point is reached the GVM is placed in a suspended state are omitted here to avoid detracting from the invention.

In one embodiment, once a SVM invocation point is defined/found such that when the SVM invocation point is reached the GVM is placed in a suspended state at FIND/DEFINE A SVM INVOCATION POINT OPERATION 412, process flow proceeds to SUSPEND THE STATE OF A FIRST GVM WHEN SVM INVOCATION POINT IS REACHED OPERATION 413.

In one embodiment, at SUSPEND THE STATE OF A FIRST GVM WHEN SVM INVOCATION POINT IS REACHED OPERATION 413 the state of a given, or "first", GVM is suspended.

In one embodiment, at SUSPEND THE STATE OF A FIRST GVM WHEN SVM INVOCATION POINT IS REACHED OPERATION 413 the state of a given, or "first", GVM, such as GVM 103 of FIG. 1, is suspended.

As discussed in more detail below, in one embodiment, using the security API, the SVM is provided access to the GVM while the GVM is in a suspended state, also referred to herein as virtual machine introspection. In one embodiment, the SVM then uses the security API to modify the contents of key CPU registers and the contents of the current stack associated with the GVM prior to releasing the GVM from the suspended state and resuming the GVM. When it resumes, the GVM executes a function call just as if it had been invoked from GVM code.

Numerous means, methods, procedures, processes, and mechanisms to suspend the state of a GVM are known to those of skill in the art. Consequently, a more detailed discussion of specific means, methods, procedures, processes, and mechanisms used to suspend the state of a GVM at SUSPEND THE STATE OF A FIRST GVM WHEN SVM INVOCATION POINT IS REACHED OPERATION 413 is omitted here to avoid detracting from the invention.

In one embodiment, once the state of a given, or "first", GVM, such as GVM 103 of FIG. 1, is suspended at SUSPEND THE STATE OF A FIRST GVM WHEN SVM INVOCATION POINT IS REACHED OPERATION 413 process flow proceeds to SAVE THE FIRST GVM STATE AT THE SVM INVOCATION POINT OPERATION 414.

In one embodiment, at SAVE THE FIRST GVM STATE AT THE SVM INVOCATION POINT OPERATION 414 the state of the GVM at the SVM invocation point of SUSPEND THE STATE OF A FIRST GVM WHEN SVM INVOCATION POINT IS REACHED OPERATION 413 is saved.

Numerous means, methods, procedures, processes, and mechanisms for saving the state of a GVM are known to those of skill in the art. Consequently, a more detailed discussion of specific means, methods, procedures, processes, and mechanisms used to save the state of a GVM at SAVE THE FIRST GVM STATE AT THE SVM INVOCATION POINT OPERATION 414 is omitted here to avoid detracting from the invention.

In one embodiment, once the state of the GVM at the SVM invocation point of SUSPEND THE STATE OF A FIRST GVM WHEN SVM INVOCATION POINT IS REACHED OPERATION 413 is saved at SAVE THE FIRST GVM STATE AT THE SVM INVOCATION POINT OPERATION 414 process flow proceeds to USE THE SVM AND SECURITY API TO MODIFY CPU REGISTERS AND/OR THE CONTENTS OF A CURRENT THREAD STACK ASSOCIATED WITH THE FIRST GVM TO TRIGGER A DESIRED FUNCTION CALL INVOCATION ONCE THE GVM IS RESUMED OPERATION 415.

In one embodiment, at USE THE SVM AND SECURITY API TO MODIFY CPU REGISTERS AND/OR THE CONTENTS OF A CURRENT THREAD STACK ASSOCIATED WITH THE FIRST GVM TO TRIGGER A DESIRED FUNCTION CALL INVOCATION ONCE THE GVM IS RESUMED OPERATION 415 using the security API of PROVIDE A SECURITY API AS AN INTERFACE BETWEEN THE HYPERVISOR AND THE SVM OPERATION 411, the SVM of IMPLEMENT AT LEAST ONE SECURITY VIRTUAL MACHINE (SVM) ON THE HOST COMPUTING SYSTEM OPERATION 407 is provided access to the first GVM while the GVM is in the suspended state of SUSPEND THE STATE OF A FIRST GVM WHEN SVM INVOCATION POINT IS REACHED OPERATION 413, and the contents of key CPU registers, e.g., the EIP and ESP registers, and the contents the GVMs associated memory, e.g., the current thread stack associated with the GVM are modified.

Figure 5:
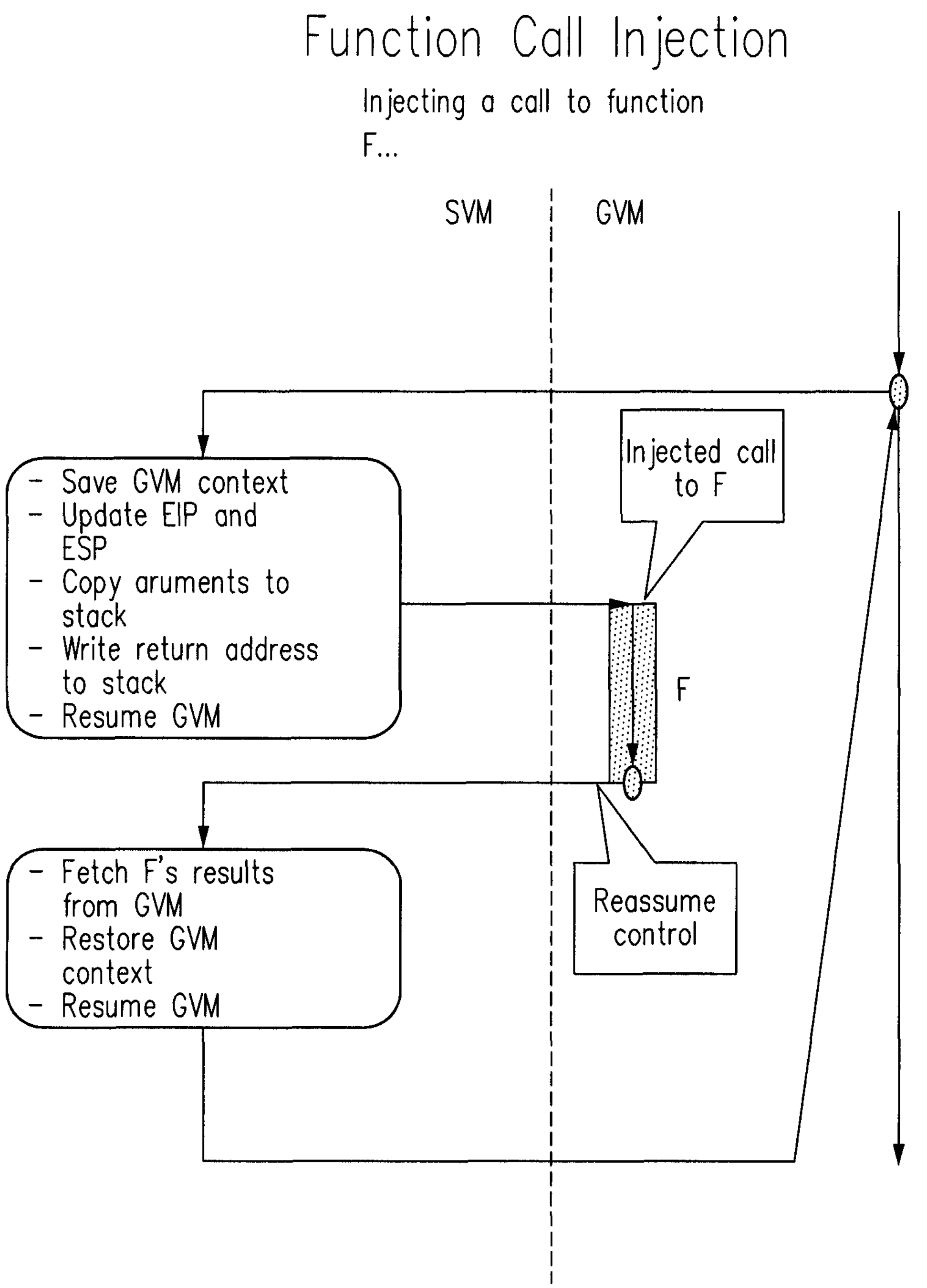
FIG. 5 is diagram of one example of one embodiment of function call injection as part of a process for injecting function calls into a virtual machine in accordance with one embodiment.

Referring to FIGS. 4 and 5 together, in one embodiment, once a trap to the SVM occurs at SUSPEND THE STATE OF A FIRST GVM WHEN SVM INVOCATION POINT IS REACHED OPERATION 413 and context of the interrupted GVM thread is saved at SAVE THE FIRST GVM STATE AT THE SVM INVOCATION POINT OPERATION 414, the SVM sets the GVM's instruction pointer, i.e., in 32 bit architectures, the Extended Instruction Pointer (EIP) register (program counter in the x86 architecture) to the address of a desired function at USE THE SVM AND SECURITY API TO MODIFY CPU REGISTERS AND/OR THE CONTENTS OF A CURRENT THREAD STACK ASSOCIATED WITH THE FIRST GVM TO TRIGGER A DESIRED FUNCTION CALL INVOCATION ONCE THE GVM IS RESUMED OPERATION 415.

In one embodiment, at USE THE SVM AND SECURITY API TO MODIFY CPU REGISTERS AND/OR THE CONTENTS OF A CURRENT THREAD STACK ASSOCIATED WITH THE FIRST GVM TO TRIGGER A DESIRED FUNCTION CALL INVOCATION ONCE THE GVM IS RESUMED OPERATION 415, the stack pointer, i.e., the Extended Stack Pointer (ESP) in a 32 bit architecture, is then subtracted so that room can be made in the stack for the arguments passed to the desired function and the return address.

In a Windows™ environment, at USE THE SVM AND SECURITY API TO MODIFY CPU REGISTERS AND/OR THE CONTENTS OF A CURRENT THREAD STACK ASSOCIATED WITH THE FIRST GVM TO TRIGGER A DESIRED FUNCTION CALL INVOCATION ONCE THE GVM IS RESUMED OPERATION 415, the location of the desired function can be determined by parsing the binary's in-memory symbol table once the base address is known. With other operating systems, different techniques may be used.

Figure 6:
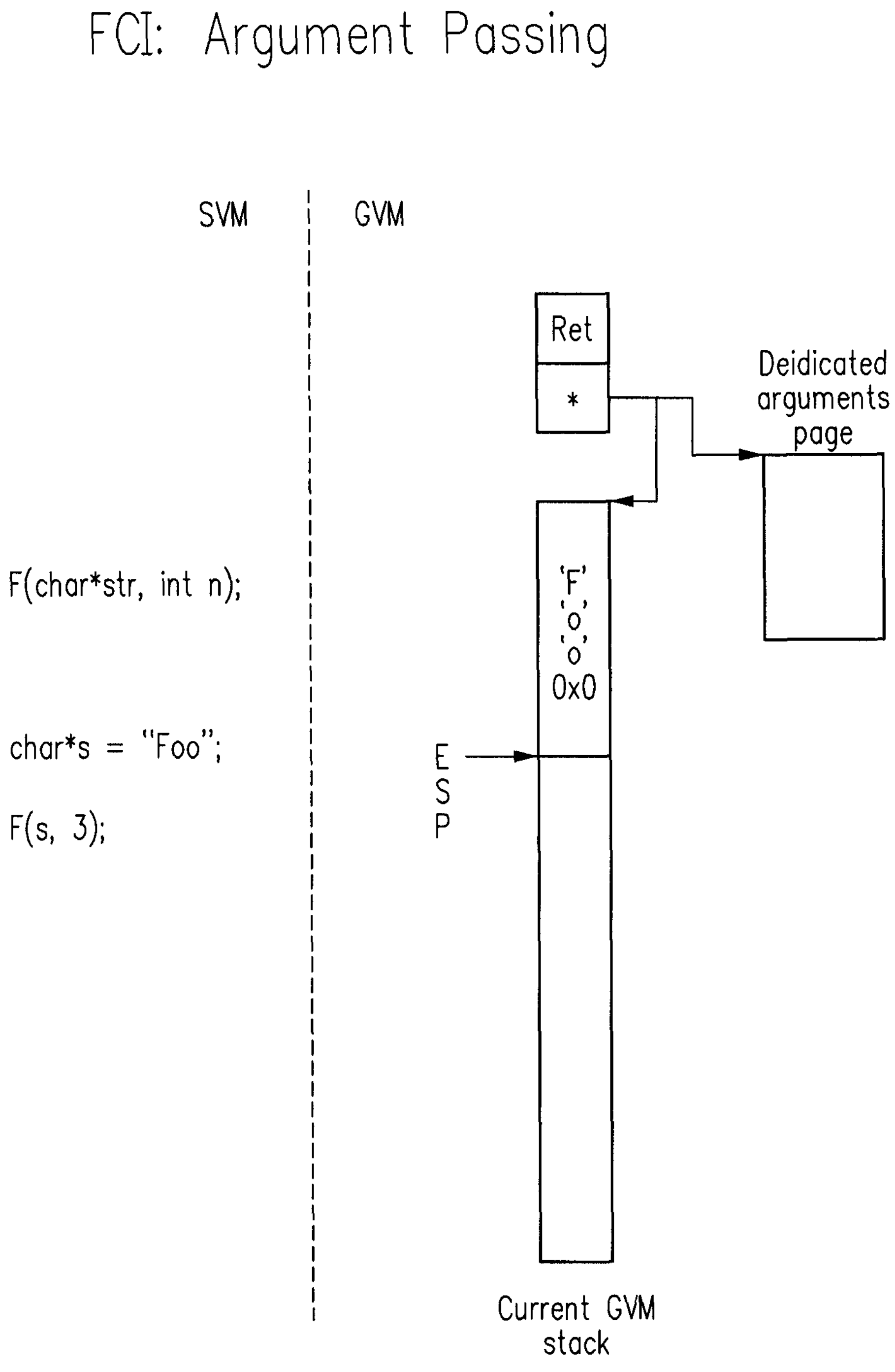
FIG. 6 is diagram of one example of one embodiment of argument passing as part of a process for injecting function calls into a virtual machine in accordance with one embodiment.

Referring to FIGS. 4, 5, and 6 together, in one embodiment, e.g., in an Intel x-86 architecture, at USE THE SVM AND SECURITY API TO MODIFY CPU REGISTERS AND/OR THE CONTENTS OF A CURRENT THREAD STACK ASSOCIATED WITH THE FIRST GVM TO TRIGGER A DESIRED FUNCTION CALL INVOCATION ONCE THE GVM IS RESUMED OPERATION 415, arguments to be passed to the desired function are copied to the stack in reverse order. In some embodiments, arguments to be passed to a desired function whose corresponding parameter is defined as call-by-value are directly copied to the stack. In some embodiments, in the case of call-by-reference arguments, a pointer pointing to the actual data is placed on the stack.

In some embodiments, at USE THE SVM AND SECURITY API TO MODIFY CPU REGISTERS AND/OR THE CONTENTS OF A CURRENT THREAD STACK ASSOCIATED WITH THE FIRST GVM TO TRIGGER A DESIRED FUNCTION CALL INVOCATION ONCE THE GVM IS RESUMED OPERATION 415 the actual data can also be on the stack, or in a dedicated memory page used for call-by-reference arguments (e.g., strings or file buffers). In one embodiment, before such a page is allocated, in one embodiment by injecting a memory allocation function call, the stack technique is used to store call-by-reference arguments.

Referring to FIGS. 4, 5, and 6 together, in one embodiment, at USE THE SVM AND SECURITY API TO MODIFY CPU REGISTERS AND/OR THE CONTENTS OF A CURRENT THREAD STACK ASSOCIATED WITH THE FIRST GVM TO TRIGGER A DESIRED FUNCTION CALL INVOCATION ONCE THE GVM IS RESUMED OPERATION 415, a FCI return address is initially set to a location in the active code segment that has no actual code, e.g., a location that is either known to be empty or is known to be typically used for padding purposes.

In one embodiment, a hypervisor-enabled execution breakpoint is placed on this memory location and the FCI return address of the desired function call is set to this hypervisor-enabled execution breakpoint. Consequently, as discussed below, when the desired function finishes executing, the final Return (RET) instruction will transfer control to this special location, suspending the GVM and trapping into the SVM.

In one embodiment, once using the security API of PROVIDE A SECURITY API AS AN INTERFACE BETWEEN THE HYPERVISOR AND THE SVM OPERATION 411, the SVM of IMPLEMENT AT LEAST ONE SECURITY VIRTUAL MACHINE (SVM) ON THE HOST COMPUTING SYSTEM OPERATION 407 is provided access to the first GVM while the GVM is in the suspended state of SUSPEND THE STATE OF A FIRST GVM WHEN SVM INVOCATION POINT IS REACHED OPERATION 413, and the contents of key CPU registers, e.g., the EIP and ESP registers, and the contents the GVMs associated memory, e.g., the current thread stack associated with the GVM are modified at USE THE SVM AND SECURITY API TO MODIFY CPU REGISTERS AND/OR THE CONTENTS OF A CURRENT THREAD STACK ASSOCIATED WITH THE FIRST GVM TO TRIGGER A DESIRED FUNCTION CALL INVOCATION ONCE THE GVM IS RESUMED OPERATION 415, process flow proceeds to RESUME THE FIRST GVM AND ALLOW THE DESIRED FUNCTION CALL TO TAKE PLACE OPERATION 416.

In one embodiment, at RESUME THE FIRST GVM AND ALLOW THE DESIRED FUNCTION CALL TO TAKE PLACE OPERATION 416 the GVM executes the desired function call of USE THE SVM AND SECURITY API TO MODIFY CPU REGISTERS AND/OR THE CONTENTS OF A CURRENT THREAD STACK ASSOCIATED WITH THE FIRST GVM TO TRIGGER A DESIRED FUNCTION CALL INVOCATION ONCE THE GVM IS RESUMED OPERATION 415 just as if it had been invoked from GVM code.

In one embodiment, once the GVM executes the desired function call of USE THE SVM AND SECURITY API TO MODIFY CPU REGISTERS AND/OR THE CONTENTS OF A CURRENT THREAD STACK ASSOCIATED WITH THE FIRST GVM TO TRIGGER A DESIRED FUNCTION CALL INVOCATION ONCE THE GVM IS RESUMED OPERATION 415 at RESUME THE FIRST GVM AND ALLOW FCI TO TAKE PLACE OPERATION 416, process flow proceeds to SUSPEND THE STATE OF THE FIRST GVM WHEN THE FCI RETURN ADDRESS OCCURS OPERATION 417.

In one embodiment, at SUSPEND THE STATE OF THE FIRST GVM WHEN THE FCI RETURN ADDRESS OCCURS OPERATION 417 when the FCI return address occurs, the GVM is placed in a suspended state.

In one embodiment, once the FCI return address occurs and the GVM is placed in a suspended state at SUSPEND THE STATE OF THE FIRST GVM WHEN THE FCI RETURN ADDRESS OCCURS OPERATION 417, process flow proceeds to RESTORE THE GVM STATE AT THE ORIGINATING SVM INVOCATION POINT OPERATION 419.

In one embodiment, at RESTORE THE GVM STATE AT THE ORIGINATING SVM INVOCATION POINT OPERATION 419 the SVM then releases the GVM and restores the saved GVM state at the SVM invocation point of SAVE THE FIRST GVM STATE AT THE SVM INVOCATION POINT OPERATION 414.

Figure 7:
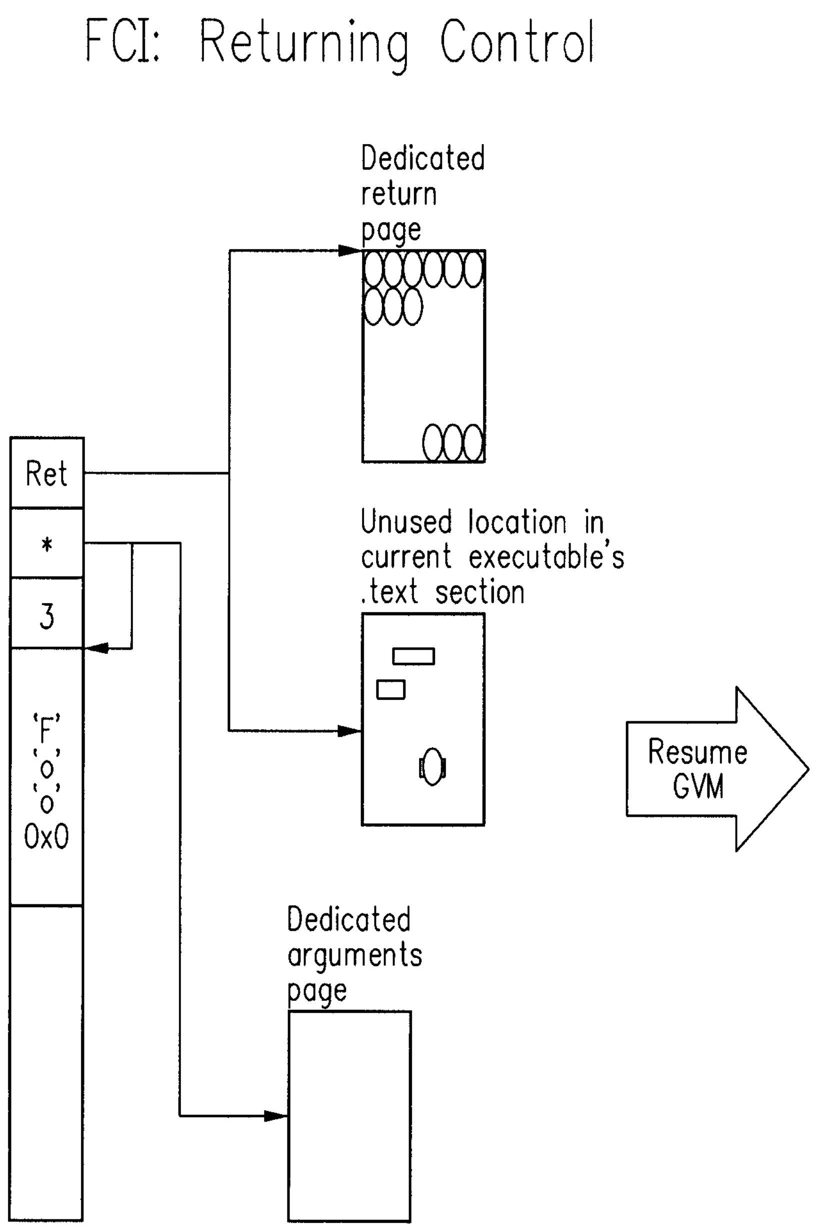
FIG. 7 is diagram of one example of one embodiment of returning control as part of a process for injecting function calls into a virtual machine in accordance with one embodiment.

FIG. 7 shows one example of restoring the initial GVM state to the state at the point at which it was interrupted when the function call injection first took place in accordance with one embodiment and one example of RESTORE THE GVM STATE AT THE ORIGINATING SVM INVOCATION POINT OPERATION 419.

Numerous means, methods, procedures, processes, and mechanisms to release a GVM from a suspended state and restore the initial state of the GVM are known to those of skill in the art. Consequently, a more detailed discussion of specific means, methods, procedures, processes, and mechanisms used to release the first GVM from the suspended state and restore the initial state of the first GVM at RESTORE THE GVM STATE AT THE ORIGINATING SVM INVOCATION POINT OPERATION 419 is omitted here to avoid detracting from the invention.

In one embodiment, once the SVM releases the GVM and restores the saved GVM state at the SVM invocation point of SAVE THE FIRST GVM STATE AT THE SVM INVOCATION POINT OPERATION 414 at RESTORE THE GVM STATE AT THE ORIGINATING SVM INVOCATION POINT OPERATION 419, process flow proceeds to THE GVM RESUMES EXECUTION AT THE ORIGINATING SVM INVOCATION POINT OPERATION 421.

In one embodiment, at THE GVM RESUMES EXECUTION AT THE ORIGINATING SVM INVOCATION POINT OPERATION 421 the first GVM resumes its execution from the point at which it was interrupted when the function call injection first took place.

Various embodiments of process for injecting function calls into a virtual machine 400 can be applied in user or kernel-mode to invoke system-level API functions without the need for an in-guest agent to be present. In addition, since the process for Function Call Injection only manipulates the GVM's virtual hardware state, it is generic enough to be used with different operating systems, although, as those of skill in the art will recognize, the invoked routines may be somewhat different.

In addition, by invoking GVM routines, instead of trying to directly interpret its memory contents, the process for Function Call Injection discussed herein reduces the semantic gap problem as it relies on the GVM's own code that naturally navigates and interprets the state of the GVM.

In one embodiment, once the first GVM resumes its execution from the point at which it was interrupted when the function call injection first took place at THE GVM RESUMES EXECUTION AT THE ORIGINATING SVM INVOCATION POINT OPERATION 421, process flow proceeds to EXIT OPERATION 430 where process for injecting function calls into a virtual machine 400 is exited to await new data.

Using process for injecting function calls into a virtual machine 400, function call invocations are triggered inside a GVM without the use, or need for, in-GVM agents. In addition, since, using process for injecting function calls into a virtual machine 400, the GVM's stack is manipulated by the SVM, the GVM's OS is used to create the desired files/function calls. Consequently, process for injecting function calls into a virtual machine 400 is a general and OS-independent solution that largely avoids the semantic gap problem.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Herein, embodiments have been discussed with reference to the accompanying FIG.s, which depict one or more exemplary embodiments. The above description includes reference to specific embodiments for illustrative purposes. However, the illustrative discussion above is not intended to be exhaustive or to limit the invention to the precise forms disclosed. Many modifications and variations are possible in view of the teachings below. The embodiments discussed above were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms than those shown and discussed herein and should not be construed as limited to the embodiments set forth herein, shown in the FIG.s, and/or described below. In addition, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "providing", "implementing", "suspending", "using", "restoring", "resuming", "receiving", "analyzing", "extracting", "generating", "sending", "capturing", "monitoring", "obtaining", "requesting", "storing", "saving", "classifying", "comparing", "calculating", "processing", "filtering", "extracting", "defining", "detecting", "transforming", "distributing", etc., refer to the action and processes of a computing system or similar electronic device that manipulates and operates on data represented as physical (electronic) quantities within the computing system memories, registers, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicably coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for injecting function calls into a virtual machine comprising:

implementing a Guest Virtual Machine (GVM) on a host computing system, the GVM including associated CPU registers and at least one memory stack associated with at least one thread implemented, at least in part, by the GVM;

implementing a hypervisor on the host computing system under the control of at least one processor associated with the host computing system;

implementing a Security Virtual Machine (SVM) on the host computing system;

implementing a security API on the host computing system under the control of at least one processor associated with the host computing system, the security API providing a hypercall interface between the hypervisor, the SVM, and the GVM;

defining a SVM invocation point;

suspending a state of the GVM at the SVM invocation point;

saving the state of the GVM at the SVM invocation point;

while the state of the GVM is suspended, using the SVM and the security API to modify the CPU registers and/or the contents of at least one memory stack associated with at least one thread implemented, at least in part, by the GVM to trigger a desired function call invocation when the GVM is resumed, wherein a return address of the desired function call is initially set to a memory location in an active code segment that has no actual code and a hypervisor-enabled execution breakpoint is placed in the memory location;

resuming the GVM;

executing the desired function call in the same manner as the desired function call would be executed if the desired function call had been invoked by the GVM;

suspending the state of the GVM when the function call return address occurs;

restoring the saved GVM state at the SVM invocation point; and resuming execution of the GVM at the SVM invocation point.

2. The computing system implemented process for injecting function calls into a virtual machine of claim 1, wherein:

the security API is configured to facilitate changes to the GVM without making changes to the hypervisor.

3. The computing system implemented process for injecting function calls into a virtual machine of claim 1, wherein:

the state of the GVM is suspended by generating a hypervisor-enabled execution breakpoint that requires no modifications inside the GVM, the hypervisor-enabled execution breakpoint being inserted at a pre-selected GVM code location, such that whenever that code is executed, a trap to the SVM occurs.

4. The computing system implemented process for injecting function calls into a virtual machine of claim 3, wherein:

the CPU registers modified include the Extended Pointer Register (EIP) and the Extended Stack Pointer Register (ESP).

5. The computing system implemented process for injecting function calls into a virtual machine of claim 4, wherein, once the trap to the SVM occurs:

the SVM initially saves a context of an interrupted GVM thread;

the SVM then sets the GVM's Extended Instruction Pointer (EIP) register to the address of the desired function; and the Extended Stack Pointer (ESP) is subtracted so that room can be made in the GVM stack for the arguments to be passed to the desired function and the return address.

6. The computing system implemented process for injecting function calls into a virtual machine of claim 1, wherein:

the return address of the desired function call is set to the hypervisor-enabled execution breakpoint such that when the desired function finishes executing, a final Return (RET) instruction transfers control to the memory location, suspending the GVM and trapping into the SVM.

7. The computing system implemented process for injecting function calls into a virtual machine of claim 1, wherein:

the SVM retrieves scalar results associated with the desired function by reading a value stored in an EAX register and the SVM retrieves other additional output parameters of the desired function directly from a memory associated with the GVM.

8. A system for injecting function calls into a virtual machine comprising:

a host computing system;

a Guest Virtual Machine (GVM) implemented on the host computing system, the GVM including associated CPU registers and at least one memory stack associated with at least one thread implemented, at least in part, by the GVM;

a hypervisor implemented on the host computing system;

a Security Virtual Machine (SVM) implemented on the host computing system;

a security API implemented on the host computing system, the security API providing a hypercall interface between the hypervisor, the SVM, and the GVM;

a processor associated with the host computing system, the processor associated with the host computing system implementing at least part of a process for injecting function calls into a virtual machine, the process for injecting function calls into a virtual machine comprising:

defining a SVM invocation point;

suspending a state of the GVM at the SVM invocation point;

saving the state of the GVM at the SVM invocation point;

while the state of the GVM is suspended, using the SVM and the security API to modify the CPU registers and/or the contents of at least one memory stack associated with at least one thread implemented, at least in part, by the GVM to trigger a desired function call invocation when the GVM is resumed, wherein a return address of the desired function call is initially set to a memory location in an active code segment that has no actual code and a hypervisor-enabled execution breakpoint is placed in the memory location;

resuming the GVM;

executing the desired function call in the same manner as the desired function call would be executed if the desired function call had been invoked by the GVM;

suspending the state of the GVM when the function call return address occurs;

restoring the saved GVM state at the SVM invocation point; and resuming execution of the GVM at the SVM invocation point.

9. The system for injecting function calls into a virtual machine of claim 8, wherein:

the security API is configured to facilitate changes to the GVM without making changes to the hypervisor.

10. The system for injecting function calls into a virtual machine of claim 8, wherein:

the state of the GVM is suspended by generating a hypervisor-enabled execution breakpoint that requires no modifications inside the GVM, the hypervisor-enabled execution breakpoint being inserted at a pre-selected GVM code location, such that whenever that code is executed, a trap to the SVM occurs.

11. The system for injecting function calls into a virtual machine of claim 10, wherein:

the CPU registers modified include the Extended Pointer Register (EIP) and the Extended Stack Pointer Register (ESP).

12. The system for injecting function calls into a virtual machine of claim 11, wherein, once the trap to the SVM occurs:

the SVM initially saves a context of an interrupted GVM thread;

the SVM then sets the GVM's Extended Instruction Pointer (EIP) register to the address of the desired function; and the Extended Stack Pointer (ESP) is subtracted so that room can be made in the GVM stack for the arguments to be passed to the desired function and the return address.

13. The system for injecting function calls into a virtual machine of claim 8, wherein:

the return address of the desired function call is set to the hypervisor-enabled execution breakpoint such that when the desired function finishes executing, a final Return (RET) instruction transfers control to the memory location, suspending the GVM and trapping into the SVM.

14. The system for injecting function calls into a virtual machine of claim 8, wherein:

the SVM retrieves scalar results associated with the desired function by reading a value stored in an EAX register and the SVM retrieves other additional output parameters of the desired function directly from a memory associated with the GVM.

15. A method for injecting function calls into a virtual machine comprising:

implementing a Guest Virtual Machine (GVM) on a host computing system, the GVM including associated CPU registers and at least one memory stack associated with at least one thread implemented, at least in part, by the GVM;

implementing a hypervisor on the host computing system;

implementing a Security Virtual Machine (SVM) on the host computing system;

implementing a security API on the host computing system, the security API providing a hypercall interface between the hypervisor, the SVM, and the GVM;

defining a SVM invocation point;

suspending a state of the GVM at the SVM invocation point;

saving the state of the GVM at the SVM invocation point;

while the state of the GVM is suspended, using the SVM and the security API to modify the CPU registers and/or the contents of at least one memory stack associated with at least one thread implemented, at least in part, by the GVM to trigger a desired function call invocation when the GVM is resumed, wherein a return address of the desired function call is initially set to a memory location in an active code segment that has no actual code and a hypervisor-enabled execution breakpoint is placed in the memory location;

resuming the GVM;

executing the desired function call in the same manner as the desired function call would be executed if the desired function call had been invoked by the GVM;

suspending the state of the GVM when the function call return address occurs;

restoring the saved GVM state at the SVM invocation point; and resuming execution of the GVM at the SVM invocation point.

16. The method for injecting function calls into a virtual machine of claim 15, wherein:

the security API is configured to facilitate changes to the GVM without making changes to the hypervisor.

17. The method for injecting function calls into a virtual machine of claim 15, wherein:

the state of the GVM is suspended by generating a hypervisor-enabled execution breakpoint that requires no modifications inside the GVM, the hypervisor-enabled execution breakpoint being inserted at a pre-selected GVM code location, such that whenever that code is executed, a trap to the SVM occurs.

18. The method for injecting function calls into a virtual machine of claim 17, wherein:

the CPU registers modified include the Extended Pointer Register (EIP) and the Extended Stack Pointer Register (ESP).

19. The method for injecting function calls into a virtual machine of claim 18, wherein, once the trap to the SVM occurs:

the SVM initially saves a context of an interrupted GVM thread;

the SVM then sets the GVM's Extended Instruction Pointer (EIP) register to the address of the desired function; and the Extended Stack Pointer (ESP) is subtracted so that room can be made in the GVM stack for the arguments to be passed to the desired function and the return address.

20. The method for injecting function calls into a virtual machine of claim 15, wherein:

the return address of the desired function call is set to the hypervisor-enabled execution breakpoint such that when the desired function finishes executing, a final Return (RET) instruction transfers control to the memory location, suspending the GVM and trapping into the SVM.

* * * * *